April 3, 1962  H. K. GILLMAN  3,027,924
MEASURING AND SEGREGATING APPARATUS
Filed Sept. 10, 1959  3 Sheets-Sheet 1

INVENTOR.
HAROLD K. GILLMAN
BY
Kane, Dalsimer and Kane
ATTORNEYS

April 3, 1962
H. K. GILLMAN
3,027,924
MEASURING AND SEGREGATING APPARATUS
Filed Sept. 10, 1959
3 Sheets-Sheet 2
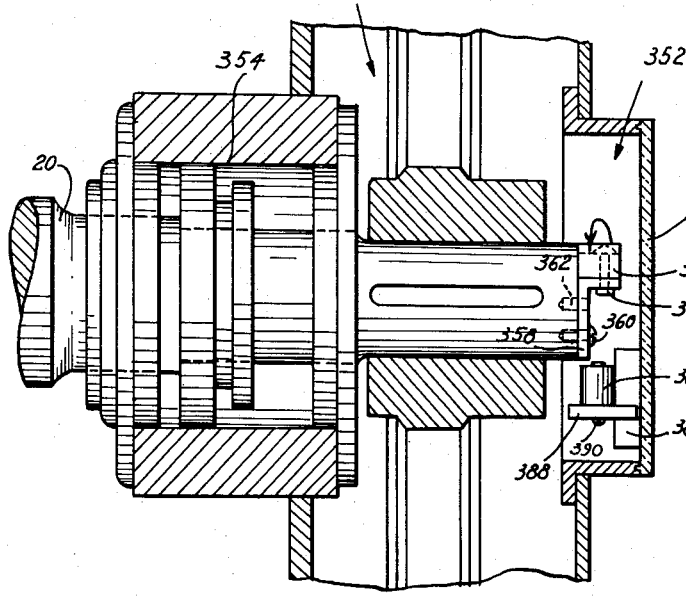
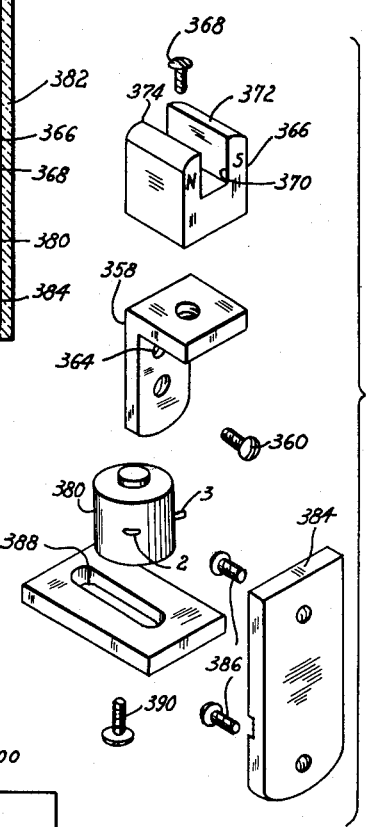
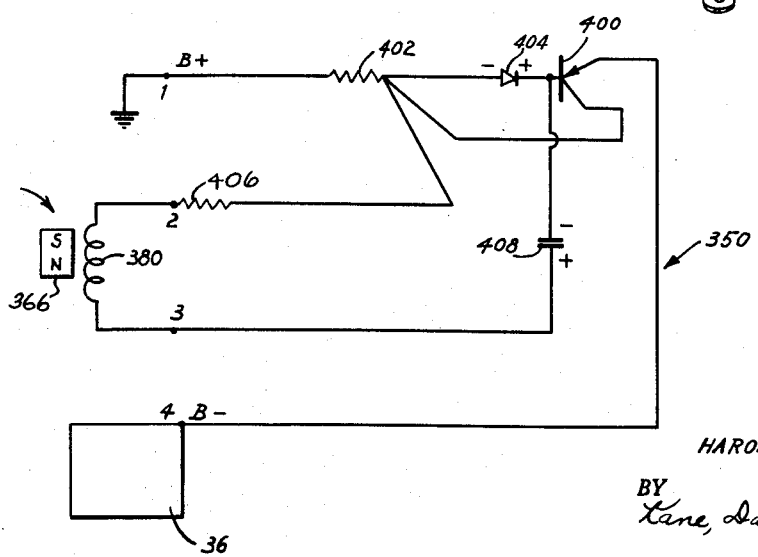
INVENTOR.
HAROLD K. GILLMAN
BY
Kane, Dalsimer and Kane
ATTORNEYS INVENTOR.
HAROLD K. GILLMAN
BY
Kane Dalsimer and Kane
ATTORNEYS United States Patent Office 3,027,924
Patented Apr. 3, 1962

3,027,924
MEASURING AND SEGREGATING APPARATUS
Harold K. Gillman, Albany, N.Y., assignor to Cashin,
Inc., Rochester, N.Y., a corporation of New York
Filed Sept. 10, 1959, Ser. No. 839,199
3 Claims. (Cl. 146—94)

This invention relates to apparatus for measuring and segregating predetermined quantities of sliced products coming from a slicing machine, and more particularly to apparatus of the type disclosed in my commonly assigned application S.N. 745,406, filed June 30, 1958, granted U.S. Patent No. 2,969,099 on January 24, 1961, and U.S. Patents No. 2,812,792 granted on November 12, 1957, and No. 2,903,032 granted on September 8, 1959. The present application is a continuation-in-part of my above-referenced application and contemplates as one of its principal objects in combination with the invention disclosed therein an improved means for synchronizing the reinitiating of the operation of the feeding mechanism of the general type specifically disclosed in U.S. Patent No. 2,812,792, when the slicing machine blade is in a position ready to properly cut the next slice of the product to be sliced.

Accordingly, it is an object of my present invention to provide such improvements, modifications and refinements in the apparatus of the aforementioned disclosures and to provide an improved measuring and segregating apparatus for sliced products which is flexible and which may be readily adjusted; which may be used with different types of food products; which does not interfere with the manual control of the slicing machine to which it is applied; in which the food engaging parts are accessible and can be readily cleaned; and which is of relatively simple and sturdy construction so that it is relatively simple to manufacture, assemble and use, and requires a minimum amount of repair.

A further object is to provide an improved measuring and segregating apparatus the use of which results in lower labor costs, more uniform packaging, savings in quantity of give-away weight, neater appearance, elimination of a considerable amount of the required human element and skill for scaling and increased premium yield.

Another object is to provide an improved means for synchronizing the reinitiation of the operation of the feeding mechanism of the slicing machine when the slicing machine blade is in a predetermined position ready to properly cut the next slice of the product to be sliced, whereby more positive control of the first slice is obtained as a consequence of the absence of metal-to-metal contact and reduction in wear of such parts and components cooperable to accomplish the function, thereby increasing the life and efficiency of the entire apparatus constructed in accordance with my present invention.

Other objects and advantages will become apparent from the following detailed description which is to be taken in conjunction with the accompanying drawings in which:

FIG. 2 is an enlarged fragmentary sectional view of part of the magnetic synchronization means associated with the slicing blade shaft;

FIG. 3 is an exploded perspective view of the components of that portion of the synchronization means illustrated in FIG. 2;

FIG. 4 illustrates electrical circuitry of the magnetic synchronization means coupled with the remaining circuitry of the measuring and segregating apparatus.

Figure 1:
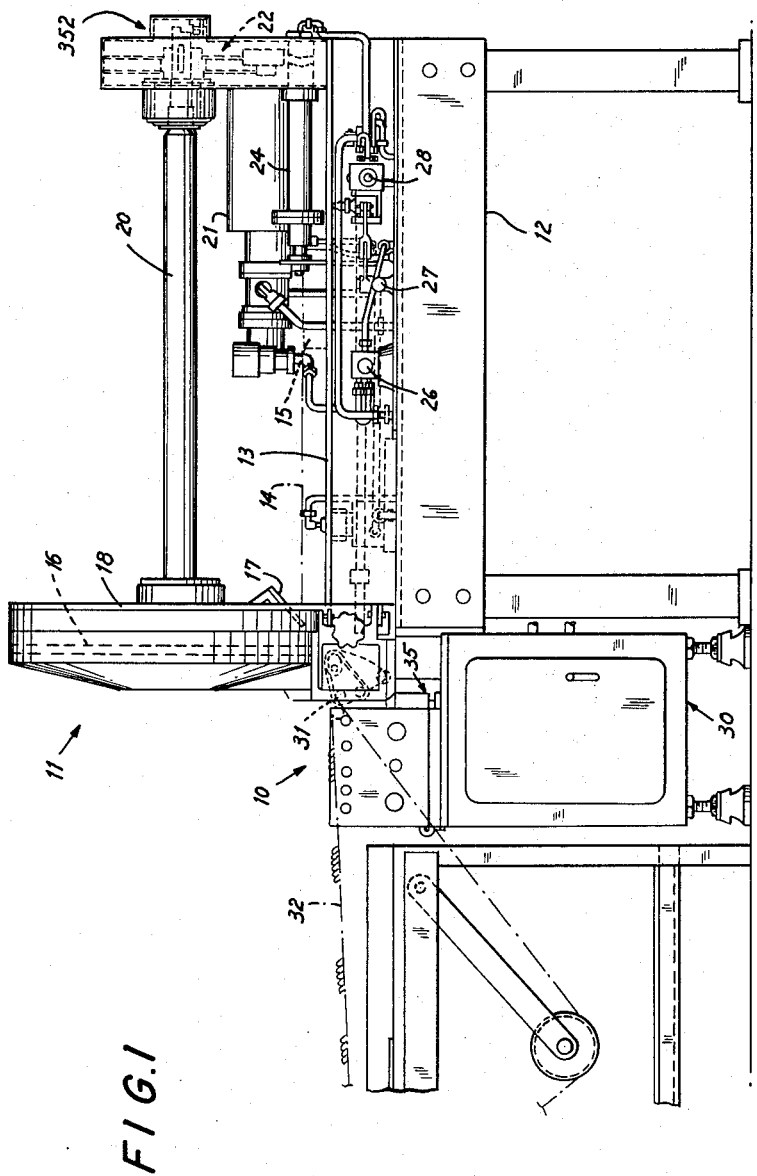
FIG. 1 is a side elevational view, partially schematic, of a measuring and segragating apparatus associated with a slicing machine and transfer conveyors.

In the accompanying drawings, I have shown a measuring and segegating apparatus 10 applied to the discharge end of a slicing machine 11 so that the sliced product coming from the slicing machine is discharged onto a conveyor weigh belt 31. The sliced product is measured, segregated from the other sliced products coming from the slicing machine, and then transferred along conveyor 32 to other stations at which the segregated sliced products are further processed and packed.

My present invention is usable with many different types of slicing machines and may assume the form disclosed in the aforementioned application and patents. In this connection, the slicing machine 11 may be of the type available commercially under the name Hydromatic Slicer, which is fully disclosed in the operating instruction for the Anco #827 Hydromatic Bacon Slicer (revised May 14, 1952) published by the manufacturer, The Allbright-Nell Co. of Chicago, Illinois. For this reason, the slicing machine 11 will not be described in detail and for a more complete explanation, reference should be made to the above-referenced disclosures.

Suffice it to say that the slicing machine 11 comprises a supporting table 12 having a platen or feed bed 13 over which the product such as bacon, meat loaf or luncheon meat, shown in phantom at 14, is fed by a pusher 15 to the slicing blade 16, shown in dotted lines, to be sliced and then discharged onto my measuring and segregating apparatus 10.

The forward or leading edge of the meat product 14 is pressed downwardly against the bed 13 so as to properly engage the blade 16 for slicing by means of the spring pressure plate 17 suitably supported adjacent the blade 16. The blade 16 is encased in a housing 18 which serves to protect the operator and also prevent the particles of sliced product from being thrown outwardly from the blade by centrifugal force.

The blade 16 is one form of commercially available rotary cutting blade and is in the form of an eccentric disc which is rotated at relatively high speeds, such as 1350 r.p.m. and above. The portion of the blade having the greatest radius serves to slice only the edge of the product, with which the portion of the blade having the minimum radius provides clearance for the product to be fed outwardly, thereby permitting the initiation of the next slicing operation. The product 14 is slowly and continuously fed forwardly by the pusher 15 and each cycle of rotation of the blade produces another slice. When the pusher feeds the product 14 forwardly at a relatively high rate of speed, the thickness of the slice is increased, and when the pusher operates at a relatively lower rate of speed, the thickness of the slice is reduced.

The blade 16 is mounted at the end of a rotatable shaft 20 and the shaft, in turn, may be driven by an electric motor 21 through suitable driving mechanism 22. Motor 21 also operates a hydraulic pump which provides the hydraulic fluid under pressure from a fluid supply tank for the operation of the hydraulic mechanism usually associated with the slicing machine and the inter-connected parts of my improved measuring and segregating apparatus 10. Reference is had to the aforementioned references for a complete description of the hydraulic circuitry normally associated with the slicing machine 11.

In brief, the pusher arm 15 is reciprocated by a hydraulic cylinder 24 through a piston which is operatively connected to the pusher arm 15. This reciprocation is controlled by means of a control valve 26 having a handle which is adapted to be depressed and retracted to cause, respectively, the initiation or stopping of reciprocation of the pusher 15. Another control lever 27 is provided in the slicing machine 11 for the purpose of providing rapid traverse or shifting of the pusher 15 in either direction. A feed control dial 28 is also provided on the slicing machine for increasing or decreasing the speed of the pusher in a forward direction. Since the slicing machine does not constitute my present invention because the illustrated slicing machine is one commercially available and of a known type, it is sufficient for present purposes to state that the aforementioned control valve 26 is suitably connected through hydraulic tubes, fittings and valves to the actuating hydraulic cylinder 24 so that when its handle is depressed to the inward position, the cylinder's piston, and consequently pusher arm 15 will be caused to reciprocate, shifting to the left, as viewed in FIG. 1, so as to feed the meat product 14 forwardly to be sliced by the blade 16. When the meat product 14 has been shifted to the left so that all of it has been sliced, the piston and pusher arm 15 are automatically retracted and then automatically start feeding forwardly again.

*Measuring and Segregating Apparatus*

My improved measuring and segregating apparatus 10 comprises a supporting scale cabinet 30 upon which is mounted a relatively high speed weigh conveyor 31 and the leading end of a ribbon transfer conveyor 32.

The leading end of the relatively high speed weigh conveyor 31 is positioned adjacent the discharge end of the slicing machine 11 so that the formed slices are discharged thereon. When a predetermined measured amount of the slices are accumulated on the conveyor weigh belt 31, they are taken by the transfer conveyor 32, which may have substantially the same speed, to other stages of the desired packaging process.

Figure 5:
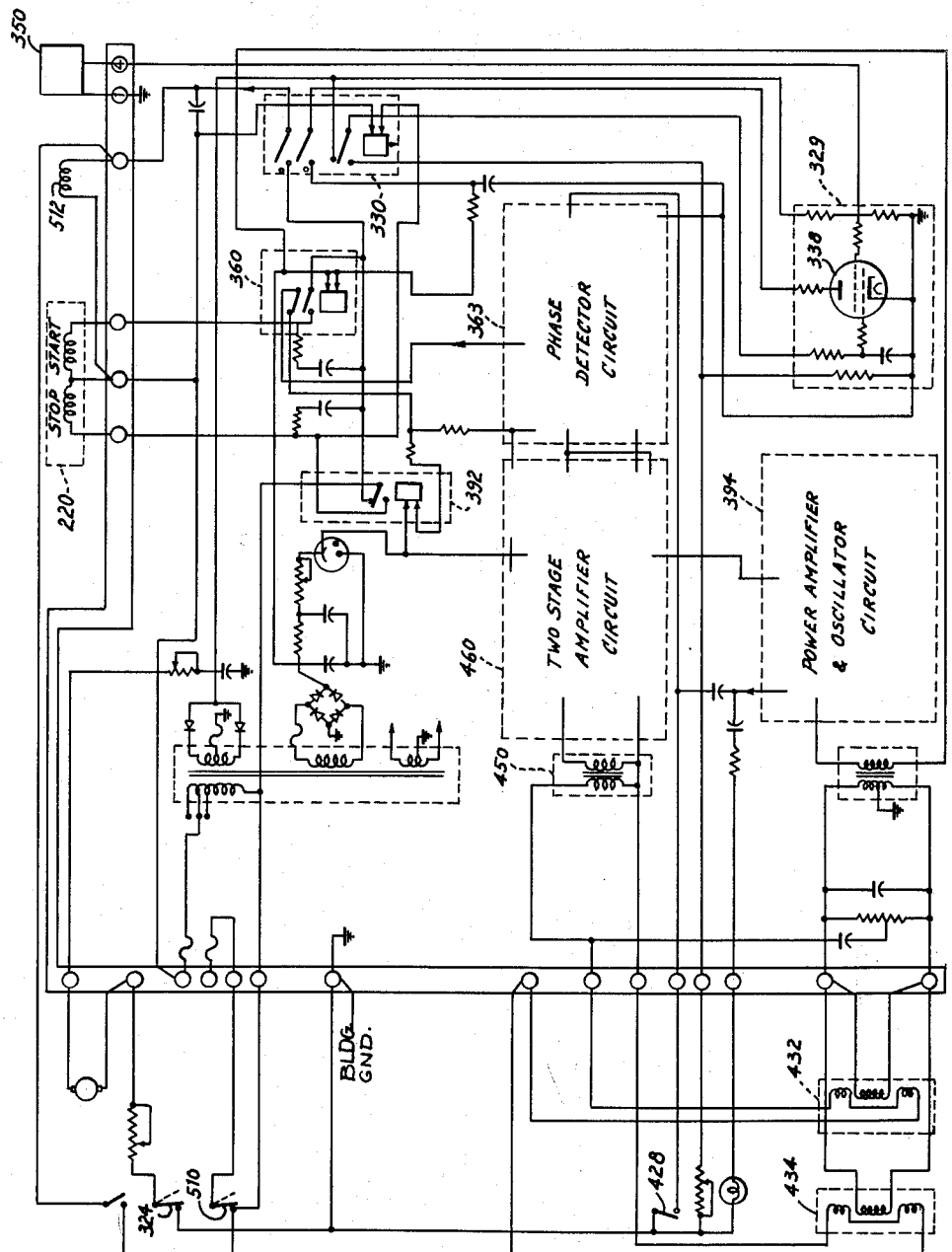
FIG. 5 is a circuit diagram of the electrical components associated with my proposed measuring and segregating apparatus with certain of the components and circuitry illustrated in block form.

Associated with the weigh conveyor 31 and the scale cabinet 30 is a scale 35 operatively associated with an electronic network 36 which, when the proper weight is registered, becomes energized and simultaneously stops the operation of the pusher arm 15 which feeds the meat product 14 through the knife blade 16. The electronic network is illustrated in detail in FIG. 5 as well as in block form in FIG. 4 and will be described shortly.

Reference should be made to the afore-referenced disclosures (as well as the Instruction Manual for the Electronic Baconweigher, Model B System, of Cashin, Inc., Albany, New York) for a more detailed description of the measuring and segregating apparatus 10 contemplated by my invention. Obviously, the receiving-platform type of arrangement disclosed in U.S. Patent No. 2,812,792 can be employed in lieu of the illustrated weigh conveyor 31.

As stated in detail in my co-pending application, the movement of pusher arm 15 is stopped when the scale 35 registers a predetermined weight of meat product 14 upon the weighing conveyor 31. In the above-identified type of slicing machine 11, pusher arm 15 is reciprocated by a piston rod extending from the piston which is displaceable in a hydraulic cylinder 24. To arrest the movement of pusher arm 15 until it is desired to reinitiate the slicing of the meat product 14, I preferably employ a double solenoid valve assembly 220 (see FIG. 5) which functions to equalize the pressure on both faces of the piston, thereby stopping the displacement of this piston within the hydraulic cylinder 24.

The electronic network 36 of the measuring and segregating apparatus 10 and associated parts may be substantially the same as that disclosed in my above-referenced patent application or Instruction Manual for the Electronic Baconweigher. Therefore, for a more complete description of this electronic network 36 and its electric components, reference should be made to these disclosures. The measuring and segregating apparatus 10 is adjusted to measure the desired predetermined quantity of the sliced product to be segregated. In this connection, a differential transformer 434, shown in FIG. 5, constituting one of a pair of matched transformers 432 and 434 of the electronic network 36, is suitably adjusted so that a predetermined weight is registered after the slices have been deposited upon the weigh conveyor 31. A power switch 510 and belt switch 324 are closed to respectively operate the measuring and segregating apparatus 10 and weigh belt conveyor 31. The product to be sliced is then placed in the slicing machine 11 and the slicing machine is then set into operation so as to cause the feeding mechanism 15 to feed the product to the rotary slicing blade 16, causing the slices to be deposited on the weigh conveyor 31. In order that the lesser grade of bacon, for example, can be trimmed without initiating the actuation of the scale 35, a trim switch 428 is closed after the first full slice appears on the weigh conveyor 31 and then immediately opened. The feeding mechanism 15 will, accordingly, stop operating at such switch closure, and a timer circuit 329 is actuated. Upon the expiration of a preset period of time, the operation of the feed mechanism 15 will resume and the slices of bacon or the like will be deposited upon the weigh conveyor 31.

A power supplier and oscillator circuit 394 energizes the primaries of differential transformers 432 and 434. When the desired predetermined quantity of slices has been accumulated on the weigh conveyor 31, an output signal will be induced as a result of the displacement of the core piece of differential transformer 432. This signal will be stepped up by a step-up transformer 450 and then amplified by a two-stage amplifier tube circuit 460. The amplified signal, under normal conditions, will be of the proper phase, and consequently will permit phase detector circuit 363 to advantageously function, thereby energizing a relay 392. Upon the energization of this relay 392, the stop side of solenoid valve 220 is energized and thusly arrests the movement of the piston in cylinder 24, and consequently the feed mechanism 15 of the slicing machine 11. Energization of this relay 392 will further permit another relay 330 to be energized to thereby energize a head lift solenoid 512 which functions to shift a bell crank mechanism for purposes of elevating the weigh conveyor 31 through a weigh head assembly, and thus the scale 35 of the weigh and measuring apparatus 10 is permitted to recover after it has registered the preselected weight placed upon the weigh conveyor 31. The energization of relay 330 will actuate the timer of circuit 329 and thusly start the desired timing action which determines the space between the batches of sliced product. After such predetermined time, and upon the actuation of synchronizing means 350, shown in detail in FIG. 4, a tube 338, which functions as a thyratron, will conduct and energize relay 360 which in turn will energize the start coil of the double solenoid valve 220 to permit the restarting of the feed mechanism 15 of the slicing machine 11. The energization of relay 360 will at the same time deenergize relays 392 and 330 and consequently result in its own deenergization.

Prior to the actuation of the timer circuit 329 upon the energization of the relay 330 the control grid of tube 338 has a bias voltage placed thereon. A second biasing voltage is applied to the screen grid of this tube 338. Therefore, in order to permit the tube 338 to conduct, it is necessary that both of these biasing voltages be removed. The removal of the first biasing voltage is, of course, effected upon the energization of the relay 330.

In order to remove the second biasing voltage, a syncroswitch means 350 is provided which is mounted on the back end of the drive shaft 20 for the blade 16. When this syncro-switch means 350 is closed, which is the case once every complete turn of the blade 16 when this blade is in the position ready to cut the next slice, the syncroswitch means earths or grounds the lead to the screen grid of the tube 338 to the space timer circuit 329. Thusly, the voltage on the screen grid of this tube 338 is reduced to thereby permit the tube to conduct. Accordingly when the blade 16 is in a position ready to cut the next slice, and after a predetermined time, the tube 338 will fire and consequently permit the restarting of the feed mechanism 15 of the slicing machine 11.

The cycle of operation is continuously repeated until the product to be sliced is entirely consumed. As each predetermined quantity of the sliced product is carried away by the transfer conveyor 32, it is thereby segregated from the other sliced products coming from the slicing machine. An operator will then place each predetermined quantity of the sliced product in the selected package or on a cardboard backing. The mounted sliced product is then transferred to a station at which it is suitably wrapped and packaged.

The present invention is particularly concerned with an improved synchronization switch means 350. Included within this synchronization switch means is a magnetic system 352 associated with the rear end of the slicer blade drive shaft 20. This drive shaft 20 is suitably journaled at this end by means of a suitable bearing 354 presented by the frame of the slicing machine 11. The magnetic system 352 comprises an angle bracket 358 which is secured to the end of the shaft by means of a screw 360. An existing dowel 362 in the present commercially available and usual drive shaft structure is adapted to be accommodated by a suitably formed bore 364 in the bracket structure. Obviously, another screw 360 can be employed instead. A permanent magnet 366 is mounted on the other leg of the bracket 358 by means of a nut and bolt means 368, the bolt of which is adapted to pass through suitably formed bores in the magnet 366 and associated leg of the bracket 358. The magnet 366 is suitably recessed as at 370 for purposes of accommodating the head of the bolt with the poles of the magnet arranged in a manner as designated in FIG. 3 and FIG. 4. In order that the terminal edges 372 and 374 of the magnet 366 will conform with the outer surface configuration of the drive shaft 20 to thereby confine the displacement of such magnet within the shaft radius, such edges are provided with a curvature corresponding with the radius of curvature of the drive shaft 20.

Magnet 366 is associated with a coil 380 for purposes of inducing a voltage as a result of the rotational displacement of the magnet 366 upon the rotation of the drive shaft 20. This coil 380 is mounted on a door 382 by means of a T-bracket 384. This bracket 384 is secured to the door by means of a series of screws 386. The leg of the bracket 384 supporting the coil 380 is provided with an elongated slot 388 which receives a screw 390 which in turn meshes with a suitably threaded bore formed in the core of the coil 380. As will be evident, the coil 380 accordingly will be displaceable along the associated leg of the bracket 384 for purposes of adjusting its position relative to the magnet 366 and thereby more effectively traverse the lines of flux of the magnet 366.

The synchronization switch means 350 comprises electrical circuitry, shown in FIG. 4, which includes the coil 380 associated with the magnet 366. This circuitry includes a transistor 400 which acts as a switch. A resistor 402 is in series with this transistor to compensate for the internal resistance thereof. The resistor 402 is connected with terminal 1 which goes to B+ or chassis ground in accordance with the circuitry disclosed in my patent application No. 745,406. For purposes of positively keeping the transistor 400 open when desired, it is preferable to have B+ voltage on the base of the transistor 400 with respect to the transistor emitter which is connected to terminal 4, the B— side of the circuit 350. A diode 404 is interposed electrically between the resistor 402 and base of the transistor 400 to thereby give the desired B— to the base of the transistor. It should be noted that this diode 404 will pass D.C. when B— is applied to the negative end and thusly act as a resistor. Furthermore, the transistor 400 will not conduct with B— on its base with respect to the emitter but will conduct upon the application of a B— voltage to its base. Under such circumstances, the present disclosure is applicable to the presence of a positive D.C. supply at the points of contact involved, namely terminals 1 and 4, as was the case with respect to the disclosure in U.S. patent application S.N. 745,406. There are a number of contemplated applications under which a pulsating D.C. supply is present across these terminals. To provide for this situation, the terminals are reversed such that terminal 1 goes to the connection with the electronic network 36 and terminal 4 goes to cabinet ground.

Since the transistor 400 will normally maintain the circuit 350 open, the magnetic system 352 is suitably arranged to permit the bias voltage on the screen grid of the tube 338 in the space timer circuit 329 to be removed when the blade 16 is in position ready to cut the next slice to thereby reinitiate the movement of the feeding mechanism 15 towards the blade 16. Thus, to have the transistor 400 closed when desired, coil 380 is included in a circuit which is connected across the diode 404. Thus, terminal 2 will serve to connect the coil 380 in series with resistor 406, which in turn is connected between the lead between resistor 402 and the negative side of diode 404, as is similarly the case with the collector of the transistor 400. Terminal 3, on the other hand, serves to connect the coil 380 in series with condenser 408 which has its negative side going to the junction between the base of transistor 400 and the positive side of the diode 404.

As the magnet 366 is rotated past the coil 380, a voltage is induced, with voltage and frequency depending upon the r.p.m. of the shaft 20 which usually ranges between 850 and 1350 r.p.m. Naturally, the spacing between the magnet 366 and coil 380 will depend upon the voltage desired, which under most circumstances will be found to be 6 to 8 volts. This voltage usually can be obtained by a spacing of 3/16 of an inch to 1/16 of an inch which likewise will depend upon the particular parameters of the electronic components involved, namely that of the magnet 366 and coil 380. Under such circumstances, a negative pulse will be received at the base of the transistor 400 from the condenser 408. The transistor 400 will only conduct or close when there is a minus voltage on its base in regard to the emitter, which minus voltage is induced every time the magnet 366 passes the coil 380. Thus, the transistor 400 will conduct and thereby trigger the electronic network 36 by removing the bias voltage on the screen grid of the tube 338 and reinitiate the operation of the feeding mechanism 15.

Thus, a brush-wiper type of switch on the slicer shaft is not essential and consequently the wearing of parts resulting from the high speed rotation of the slicer blade shaft 30 is significantly minimized while still maintaining an effectively operable synchronization switch means 350.

Modifications may, of course, be made in the illustrated and described embodiment of my invention without departing from the invention as set forth in the accompanying claims.

I claim:

1. In a measuring and segregating apparatus of the type for use in combination with a slicing machine which is adapted to slice a product and which includes a slicing blade and a supporting shaft assembly mounted for rotation, means for rotating the shaft assembly, a reciprocally mounted feeder for feeding the product to be sliced to the slicing blade and drive means for causing the feeder to operate, and additionally of the type which itself includes a supporting structure, a receiving means supported by said supporting structure adjacent the discharge end of the slicing machine so as to receive the sliced product coming therefrom, measuring means responsive to a predetermined quantity of sliced product discharged by said slicing machine, control means having operative interconnection between the measuring means and the drive means of the feeder of the slicing machine so as to interrupt the operation of the feeder when a predetermined quantity of the sliced product has been discharged by said slicing machine, with said control means including means for automatically reinitiating the operation of the feeder after it has been interrupted for a predetermined period of time and further means for delaying the operation of the feeder until the blade is in a predetermined position, the improvement of a magnet on said shaft assembly and a conducting means mounted on said slicing machine in proximity to the path of travel of said magnet, and said conducting means adapted to be actuated by said magnet when passed through the magnetic field thereof for affecting the operation of said feeder upon predetermined movement of said magnet past said conducting means.

2. The invention in accordance with claim 1, wherein said improvement includes a first electrical circuit connecting said control means to ground and including a transistor for normally opening this connection to ground, said conducting means comprising an electrical coil, and a second circuit including said coil being electrically coupled with said first circuit for actuating said transistor to close the connection of said control means to ground when said blade is in said predetermined position.

3. In a measuring and segregating apparatus of the type for use in combination with a slicing machine which is adapted to slice a product and which includes a high speed, continuously operating rotary slicing blade and a supporting shaft assembly mounted for rotation, means for rotating the shaft assembly, a reciprocally mounted feeder for feeding the product to be sliced to the slicing blade and drive means for causing the feeder to operate, and additionally of the type which itself includes a supporting structure, a receiving and conveying means supported by said supporting structure adjacent the discharge end of the slicing machine so as to receive the sliced product coming therefrom, control means operatively connected to said feeder for interrupting the operation of the feeder, with said receiving and conveying means operating during said interruption of the feeder to convey the sliced products away, weighing means operatively connected to the receiving and conveying means for causing the operation of the control means when a predetermined weight of the sliced product has been discharged onto the receiving and conveying means, with said control means including means for automatically reinitiating the operation of the feeder after it has been interrupted for a sufficient period of time for the predetermined quantity of sliced product to be conveyed away, the improvement of further control means in operative relation to the slicing blade and supporting shaft assembly for delaying the reinitiation of the operation of the feeder until the blade is in a predetermined position, said further control means including a magnet on said shaft assembly and a conducting means mounted on said slicing machine in proximity to the path of travel to said magnet, and said conducting means adapted to be actuated by said magnet when passed through the magnetic field thereof for affecting the operation of said feeder upon predetermined movement of said magnet past said conducting means.

References Cited in the file of this patent

UNITED STATES PATENTS

| | | |
|---|---|---|
| 2,078,792 | FitzGerald | Apr. 27, 1937 |
| 2,114,016 | Dimond | Apr. 12, 1938 |
| 2,744,553 | Folk | May 8, 1956 |
| 2,812,792 | Allbright | Nov. 12, 1957 |
| 2,852,195 | Coleman et al. | Sept. 16, 1958 |
| 2,870,810 | Folk | Jan. 27, 1959 |
| 2,903,032 | Cervene | Sept. 8, 1959 |

OTHER REFERENCES

"Shingle and Weigh Bacon Automatically" (The National Provisioner), Mar. 19, 1955 (pp. 8 to 10 relied on).